United States Patent [19]
Ao et al.

[11] Patent Number: 5,656,936
[45] Date of Patent: Aug. 12, 1997

[54] DISPLACEMENT DETECTING DEVICE

[75] Inventors: Kenichi Ao, Tokai; Yoshimi Yoshino, Anjo; Yasuaki Makino, Okazaki; Seiki Aoyama, Toyohashi, all of Japan

[73] Assignee: Nippondenso Co., Ltd., Kariya, Japan

[21] Appl. No.: 588,329

[22] Filed: Jan. 18, 1996

[30] Foreign Application Priority Data

Jan. 19, 1995 [JP] Japan .................................. 7-026168

[51] Int. Cl.⁶ .............................. G01R 33/09; G01B 7/30
[52] U.S. Cl. .............................. 324/207.21; 324/207.25
[58] Field of Search .................. 324/207.21, 207.2, 324/207.25, 207.24, 207.15, 207.16, 173, 174, 251, 252, 207.12; 338/32 R, 32 H

[56] References Cited

U.S. PATENT DOCUMENTS

| | | | |
|---|---|---|---|
| 3,917,997 | 11/1975 | Sidor | 324/174 |
| 4,296,277 | 10/1981 | Ohkubo . | |
| 4,492,922 | 1/1985 | Ohkubo . | |
| 4,712,083 | 12/1987 | Heck et al. | 324/207.21 X |
| 4,853,632 | 8/1989 | Nagano et al. | 324/207.21 |
| 5,210,489 | 5/1993 | Petersen | 324/207.21 |
| 5,315,260 | 5/1994 | Link et al. | 324/207.21 X |
| 5,351,028 | 9/1994 | Krahn | 324/207.21 X |
| 5,359,287 | 10/1994 | Watanabe et al. . | |

FOREIGN PATENT DOCUMENTS

| | | |
|---|---|---|
| 0 539 602 | 5/1993 | European Pat. Off. . |
| 1-40510 | 8/1989 | Japan . |
| 1-316980 | 12/1989 | Japan . |
| 5-180664 | 7/1993 | Japan . |

*Primary Examiner*—Sandra L. O'Shea
*Assistant Examiner*—Roger Phillips
*Attorney, Agent, or Firm*—Cushman, Darby & Cushman IP Group of Pillsbury Madison & Sutro LLP

[57] ABSTRACT

A displacement detector to obtain high-precision displacement detection with a small-sized, low-cost apparatus. A displacement detector comprises rectangular teeth formed on the outer circumference surface at a pitch of $\lambda$, a gearwheel made of a magnetic material, a magnet having a width larger than the pitch $\lambda$ of the gearwheel and so disposed that the N-pole thereof faces the teeth, and a pair of MREs constructed by alternately connecting the long strip portions and short strip portions thereof to have a zigzag shape. A uniform cyclic magnet field from the magnet to the gearwheel is formed within a gap between the gearwheel and the magnet. On the same phase of the magnet field are disposed the pair of MREs so that the directions of the long strip portions thereof and the directions of the magnetic force lines make angles of approximately 45° and approximately 135°, respectively.

35 Claims, 8 Drawing Sheets

DISPLACEMENT DETECTING DEVICE

CROSS REFERENCE TO RELATED APPLICATION

This application is based upon and claims the benefit of priority of the prior Japanese Patent Application No. 7-26168 filed on Jan. 19, 1995, the contents of which are incorporated herein by reference.

BACKGROUND OF THE INVENTION

1. Field of the Invention

The present invention relates to a displacement detector which detects the variation of magnetic field by utilizing the variation of the resistance of a magnetoresistive element (hereinafter referred to as an MRE) and detects the motional condition of a moving body or a rotating body based on the detected magnetic field variation.

2. Related Arts

A conventional displacement detector using an MRE, the resistance of which varies according to magnetic variation, has been used in a wide variety of fields for the features thereof, such as reliable operation, high precision, high durability and easy downsizing.

As one such displacement detector, Watanabe et al., U.S. Pat. No. 5,359,287, discloses a sensor which comprises two pairs of MREs and detects the magnetic variation responsive to the revolution or displacement of the rotating body as a detection subject having gear teeth arranged at a constant pitch to detect the amount of the revolution or displacement of the detection subject. As illustrated in FIGS. 11 and 12, each of the MREs 14a, 14b, 14c and 14d installed in the sensor is so constructed by long strip portions and short strip portions alternately joined end to end for a plurality of times that the long strip portions are inclined by approximately 45° or 135° with respect to the direction B of magnetic force lines emitted from a bias magnet.

As there has been a strong demand for high-precision detection in recent years, it has become necessary to narrow the gear tooth pitch of the detection subject to increase the number of pulses per revolution of the rotating body.

If the gear tooth pitch is narrowed, in a case of the MRE arrangement shown in FIG. 11, as the magnetic force lines passing through the respective MREs 14a(14b) and 14c (14d) become different, there is a problem that high-accuracy detection is impossible. On the other hand, in a case of the MRE arrangement shown in FIG. 12, as the distances between the gear teeth and the respective MREs 14a through 14d differ from each other, there is also a problem that the resultant output is small.

To solve these problems, an MRE arrangement of two-layered structure in which the respective pairs of MREs 14a and 14c and MREs 14b and 14d disposed at angles of approximately 45° and approximately 135°, respectively, to the direction B of magnetic force line are stacked as shown in FIG. 13 as proposed in Watanabe et al. Furthermore, a detector in which an even number of and at least four MREs 14e through 14l are disposed in parallel to each other and connected in series to each other as illustrated in FIG. 14 and proposed in the Japanese Unexamined Patent Publication No. 5-180664.

However, these devices have posed problems. In the detector illustrated in FIG. 13, as the structure is complicated, the manufacturing process is also so complicated that the detector becomes expensive. In the detector illustrated in FIG. 14, as more MREs are required compared with the detector illustrated in FIG. 13, and differential amplification circuits 12 are required for one half the number of the MREs 14e through 14l, detector itself inevitably becomes not only larger in size but higher in cost.

SUMMARY OF THE INVENTION

In view of the above, it is an object of the present invention to provide a small-sized and relatively simple displacement detector which can obtain a stable output with high-precision.

A displacement detecting device according to the present invention comprises: a first member provided with a plurality of protrusive parts which have almost the same pitch and shape; a second member disposed in opposition to the first member, a facing surface thereof having a width wider than one pitch of the protrusive parts of the first member, wherein at least one of the first and second members is made of a magnetism generating material to impart to a gap between the first and second members a magnetic field which cyclically changes in response to a displacement of the protrusive parts of the first member with respect to a width direction of the second member; first and second magnetoresistive elements disposed between the first member and the second member such that the first and second magnetoresistive elements are apart from each other in the width direction of the second member and so that, when the first magnetoresistive element approaches one of the protrusive parts of the first member, the second magnetoresistive element approaches another protrusive part of the first member; and a means for detecting the displacement of the protrusive parts of the first member based on variation of respective resistance values of the first and second magnetoresistive elements according to variation of the magnetic field.

That is, as the center-to-center distance between MREs making a pair is at least as long as one pitch of the protrusive parts of the detection subject, even if the pitch of the protrusive parts of the detection subject is narrow, each of a pair of MREs can accurately and easily be disposed in such a position where tee magnetic field can vary in the same phase, and as a result, sufficient output and precise detection can be obtained.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

The present invention will be described hereafter referring to a specific embodiment.

Figure 1:
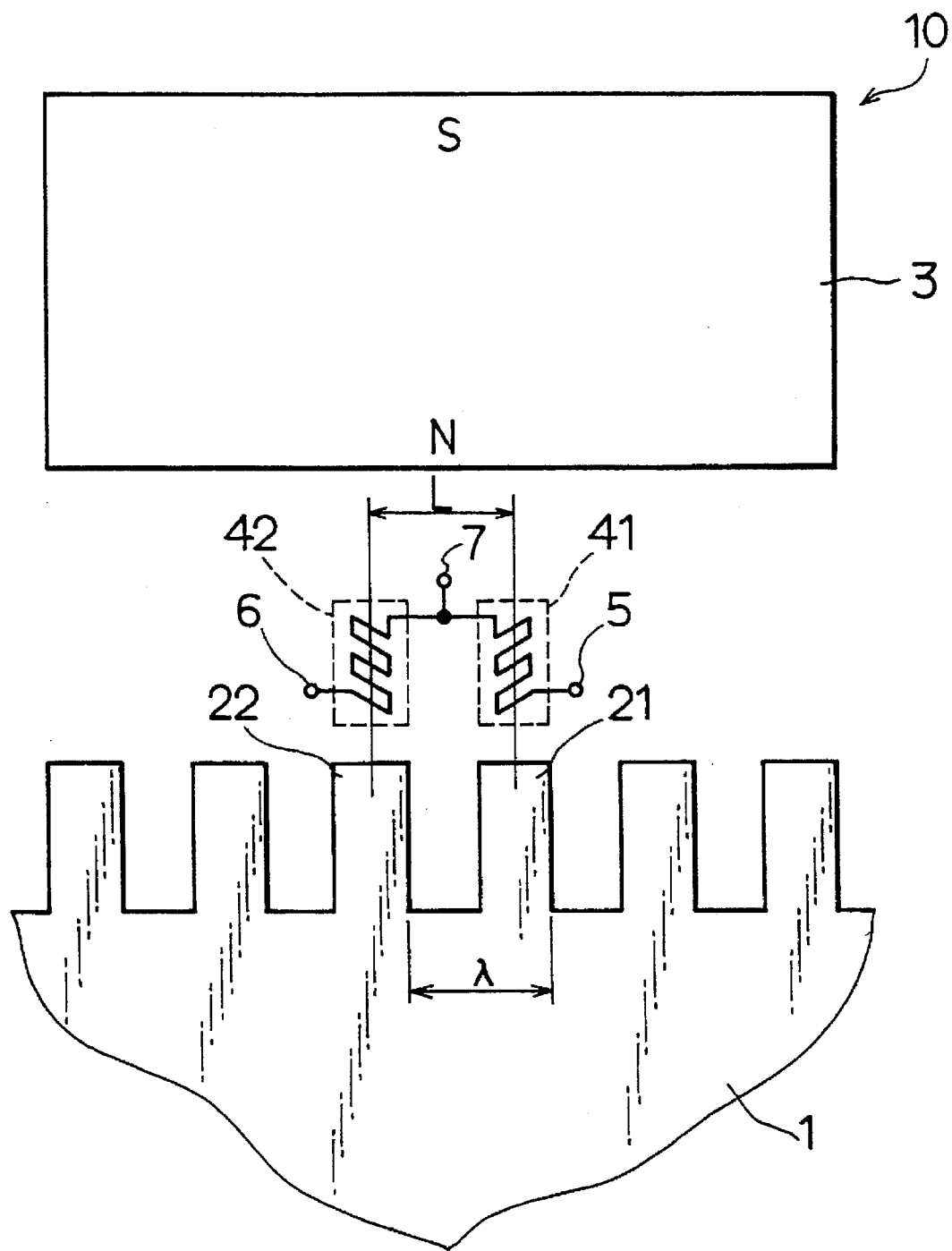
FIG. 1 is a schematic view showing the construction of a first embodiment according to the present invention.

FIG. 1 illustrates the construction of the first embodiment according to the present invention.

A displacement detector 10 is a revolution detector used for detecting rotational speed, rotational angle, etc. which comprises a gearwheel 1 (corresponding to the first member) disposed coaxially with a detection subject (rotating body) and provided with rectangular teeth (corresponding to protrusive parts) 21, 22, . . . on the outer circumferential surface, formed at a pitch $\lambda$ and made of a magnetic material; a magnet 3 (corresponding to the second member) having a width larger than the pitch $\lambda$ of the gearwheel 1 and so disposed as to face the N-pole thereof toward the teeth 21, 22, . . . ; and a pair of MREs 41 and 42 (corresponding to the first and second magnetoresistive elements) disposed within a gap between the gearwheel 1 and the magnet 3.

When the gearwheel 1 rotates, a cyclic magnetic field is formed within the gap between the gearwheel 1 and the magnet 3 in the direction from the magnet 3 to the gearwheel 1 according to the variation of the position of the teeth 21, 22, . . . of the gearwheel 1.

The MREs 41 and 42 are disposed at positions where the magnetic field of the same phase are imparted thereto even when the gearwheel 1 rotates. Namely, the MREs 41 and 42 are positioned so that the center-to-center distance L between the MRE 41 and the MRE 42 is almost equal to the pitch $\lambda$ of the teeth 21, 22, . . . of the gearwheel 1. Accordingly, the variations of the magnetic field angle acting on the MREs 41 and 42 are identical irrespective of the positional change of the teeth 21, 22, . . . of the gearwheel 1.

As the magnetic force lines emitted from the magnet 3 toward the gearwheel 1 act not on the notches but on the teeth 21, 22, . . . of the gearwheel 1, the outputs from the MREs 41 and 42 can be increased by so disposing the MREs 41 and 42 that the center-to-center distance L therebetween is almost equal to the pitch $\lambda$ of the teeth 21, 22, . . . of the gearwheel 1.

The MREs 41 and 42 are so composed that the long strip portions and short strip portions thereof are alternately connected to have a comb-teeth or zigzag-shaped pattern, and are also so arranged that the long strip portions thereof form angles of approximately 45° and approximately 135°, respectively, with respect to the magnetic force lines emitted from the magnet 3 toward the gearwheel 1.

The MREs 41 and 42 form a half bridge circuit. An end of the MRE 41 is provided with a terminal 5, and the other end thereof is connected to the MRE 42. In the intermediate position between the MREs 41 and 42, a terminal 7 is provided as a middle point terminal of the half bridge circuit. The other end of the MRE 42 is provided with a terminal 6.

Next, the variation of the resistance of the MREs 41 and 42 according to the revolution of the gearwheel 1 in the displacement detector 10 of the above construction will be described.

Figure 2:
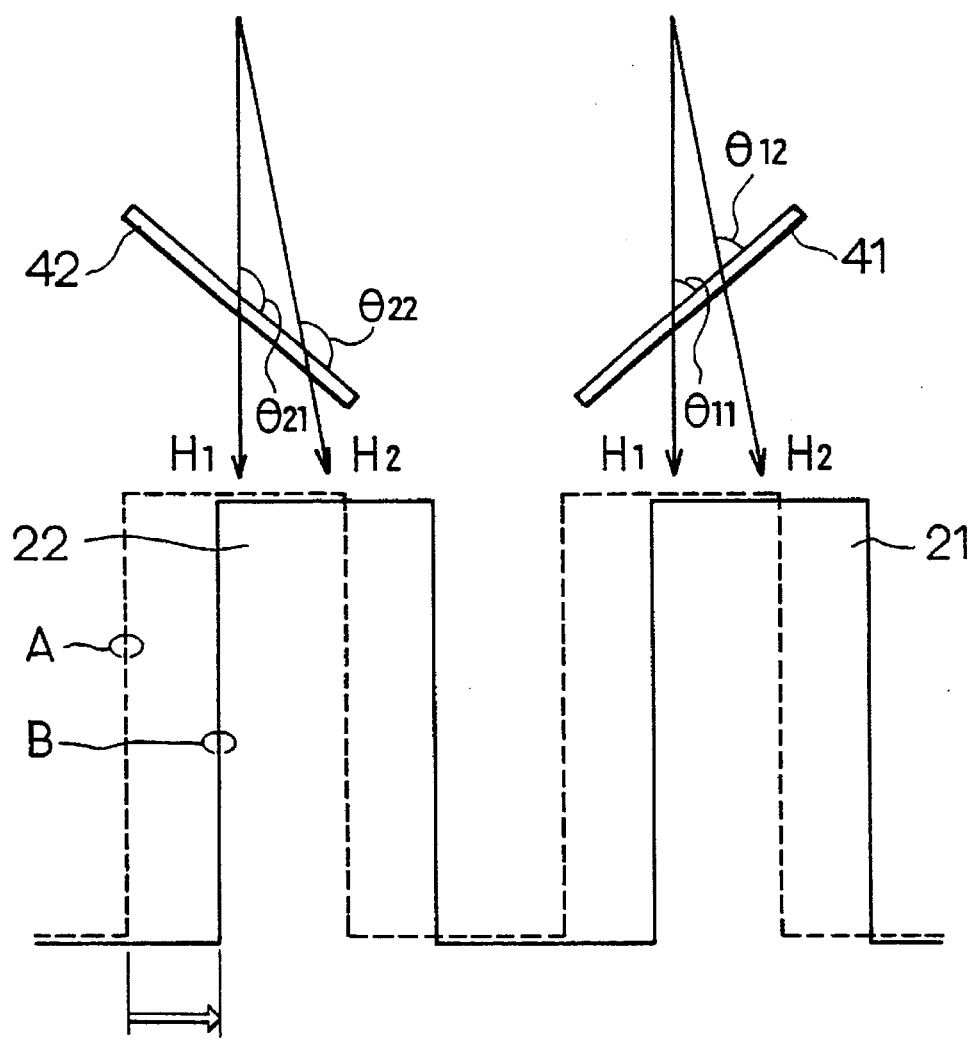
FIG. 2 is a model view illustrating the variation of the direction of magnetic force lines when a pattern of the MRE is regarded as a single long strip pattern.

To simplify the description, referring to FIG. 2, the MREs 41 and 42 will be supposed to be single linear MREs inclined by approximately 45° and approximately 135°, respectively, to the magnetic force lines emitted from the magnet 3.

In FIG. 2, when the gearwheel 1 rotates in a direction indicated by an arrow and a certain time has elapsed, the teeth 21 and 22 shift from a position A (indicated by a dotted line) to a position B (indicated by a solid line). Along with this shift, the magnetic force lines are drawn by the shifted teeth 21 and 22, and the directions of the magnetic force lines change from H1 to H2. Accordingly, the angles of the MREs 41 and 42 to the directions of the magnetic force lines, H1 and H2, change from $\theta_{11}$ to $\theta_{12}$ and from $\theta_{21}$ to $\theta_{22}$, respectively.

Figure 3:
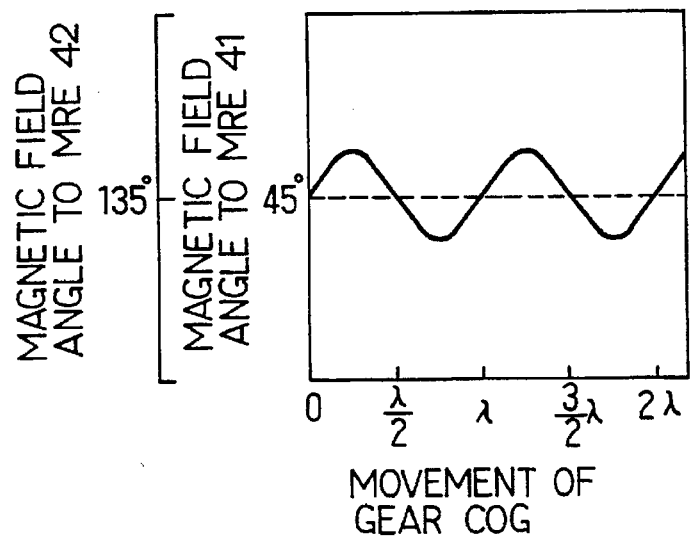
FIG. 3 is a graph showing the variation of the angle of an MRE to the direction of magnetic force line according to the amount of the revolution of a gearwheel.

FIG. 3 illustrates the variations of the angles of the respective MREs 41 and 42 to the directions of the magnetic force lines in relation to the amount of movement (amount of revolution) of the teeth 21 and 22 of the gearwheel 1 when the gearwheel 1 is rotated as described above.

It is understood from FIG. 3 that the angles of the MREs 41 and 42 to the directions of the magnetic force lines vary centering around angles of 45° and 135°, respectively, in response to the revolution of the gearwheel 1.

Figure 4:
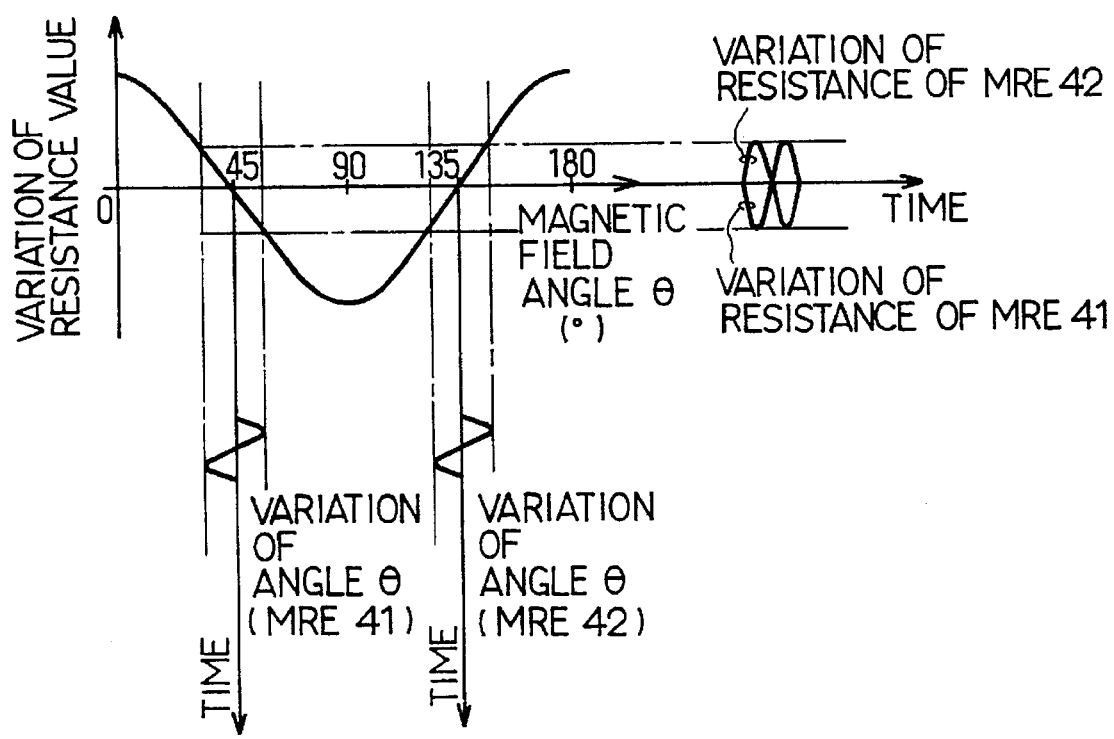
FIG. 4 is a graph showing the relationship between the resistance value of an MRE and the angle of the direction of magnetic force line acting on the MRE.

FIG. 4 illustrates the relationship between the resistance value of the MRE and the angle of the magnetic field applied to the long strip portions of the MRE. Here, FIG. 4 also illustrates the state of the variation of the angles of the applied magnetic field (in the same phase) in the respective positions of the MREs 41 and 42, and the state of the variation of the respective resistance values of the MREs 41 and 42 according the variation of such angles. As shown in FIG. 4, the angles of the magnetic fields applied to the respective MREs 41 and 42 vary in the same phase, centering around angles of 45° and 135°, respectively, and according to this, the resistance values of the respective MREs 41 and 42 fluctuate. At this time, the resistance values of the MREs 41 and 42 characteristically fluctuate in such directions as to oppose to each other, i.e., the resistance value of the MRE 41 increases whereas the resistance value of the MRE 42 decreases.

Figure 5:
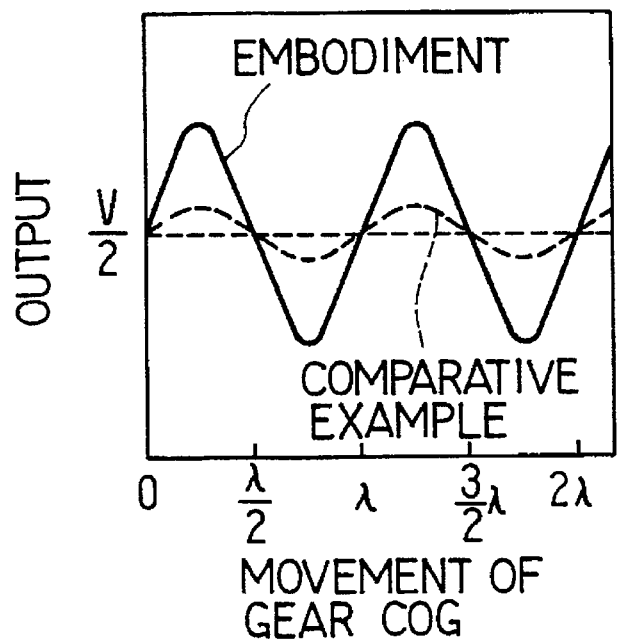
FIG. 5 is a graph showing the variation of the output of the mid point terminal of a half bridge according to the amount of the revolution of the gearwheel.
Figure 11:
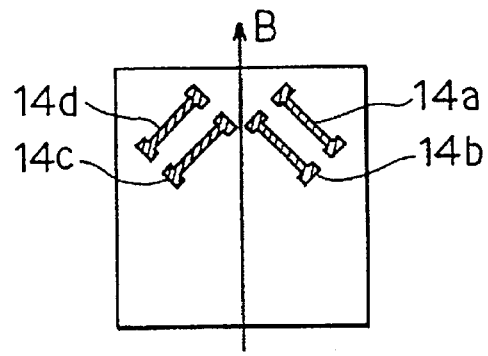
FIG. 11 is a view illustrating a conventional construction in which two pairs of MREs are symmetrically disposed.
Figure 12:
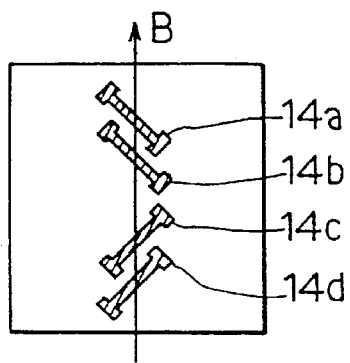
FIG. 12 is a view illustrating a conventional construction in which two pairs of MREs are disposed in the direction of the magnetic force lines.
Figure 13:
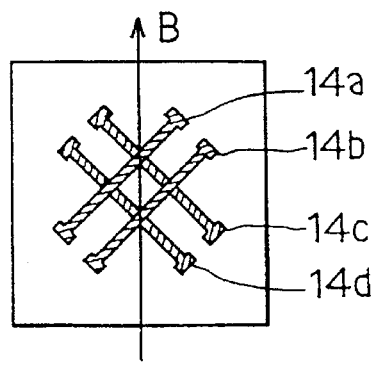
FIG. 13 is a view illustrating a conventional construction in which two pairs of MREs are disposed in stack.
Figure 14:
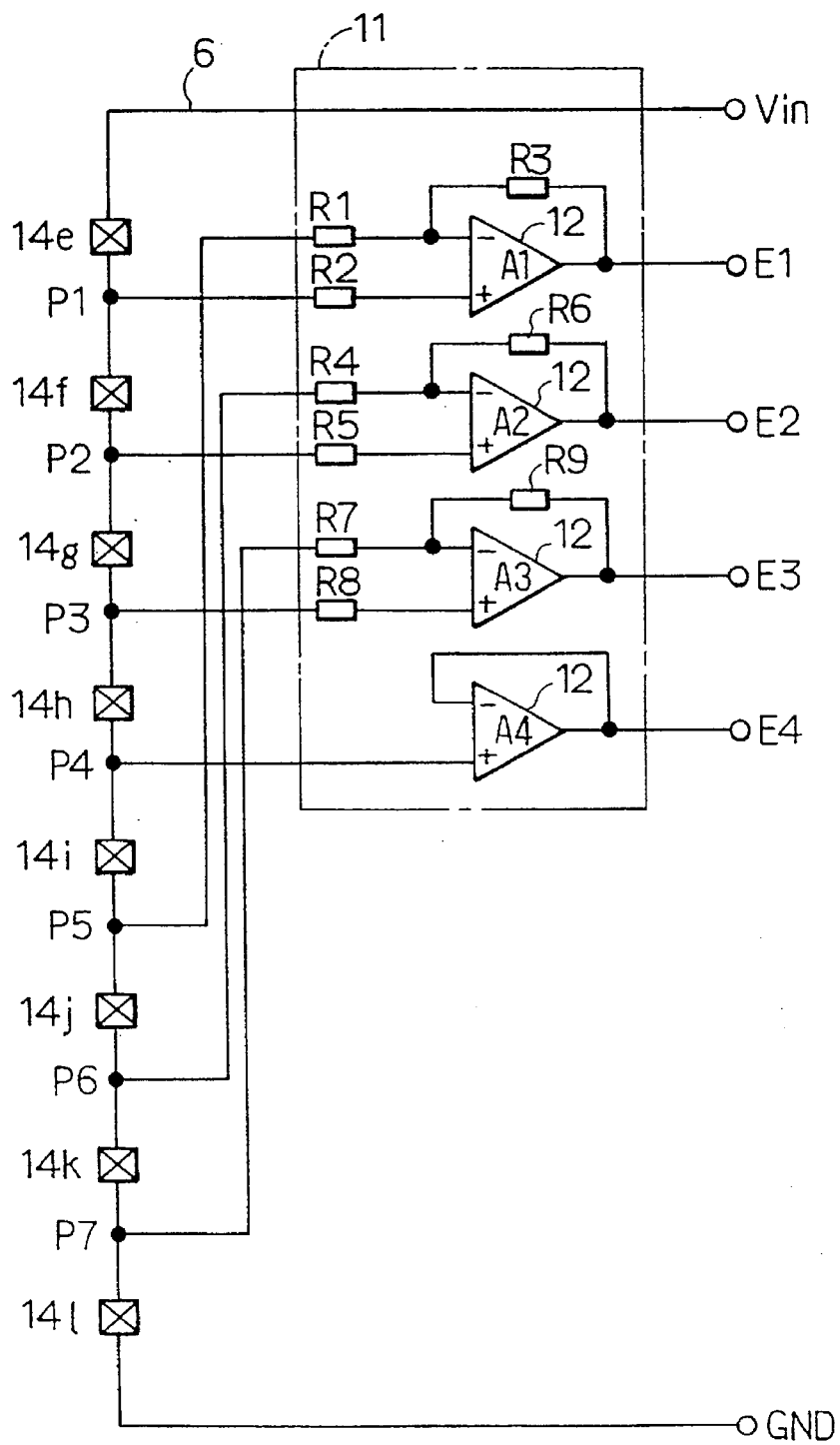
FIG. 14 is an electric circuit diagram illustrating a conventional construction in which eight pieces of MREs are disposed in parallel to each other and connected in series to each other.

FIG. 5 shows the variation of the output of the middle point terminal 7 of the half bridge circuit in relation to the amount of revolution of the gearwheel 1 when the terminal 5 of the MRE 41 (FIG. 1) is subjected to voltage V and the terminal 6 of the MRE 42 (FIG. 1) is grounded, and also shows the variation of the output of the comparative example in which two pairs of MREs are disposed against a minute single tooth of the gearwheel 1 like an arrangement shown in FIG. 11 or 12.

It is understood from FIG. 5 that this embodiment obtains three times or more the output of the comparative example, and also that the performance of the displacement detector 10 can be raised even if the pitch is narrowed. Furthermore, as only one pair of MREs is sufficient, the displacement detector 10 can be downsized, and therefore the cost thereof can be reduced.

Figure 6:
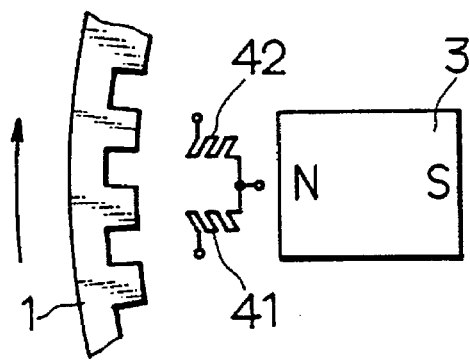
FIG. 6 is a model view illustrating the construction in which a magnet and MREs are disposed at the inside of the gearwheel.

In this embodiment, the teeth 21, 22, . . . are formed on the outer circumferential surface of the gearwheel 1, and the magnet 3 and the MREs 41 and 42 are disposed at the outside of the gearwheel 1. However, the present invention should not limited to the above embodiment but may also be so constructed, as illustrated in FIG. 6, that the gearwheel 1 has an annular or cylindrical shape with the teeth 21, 22, . . . formed on the inner circumferential surface thereof and the magnet 3 and the MREs 41 and 42 are disposed inside the gearwheel 1.

Furthermore, in the above embodiment, the gearwheel 1 of magnetic material is rotated and the magnet 3 and the MREs 41 and 42 are fixed in detecting the displacement of the gearwheel 1. However, the present invention should not be limited to this construction, but may also be so constructed that the gearwheel 1 is fixed and the magnet 3 and the MREs 41 and 42 are rotated around the fixed gearwheel 1 in detecting the displacement of the magnet 3. Moreover, in the above embodiment, the teeth and notches having almost the same pitch and shape are formed on the gearwheel 1 made of a magnetic material. However, the present invention should not be limited to this construction but may be so constructed that the bias magnets are installed on the respective teeth of the gearwheel 1, or that protrusions are formed on the magnet 3.

In addition, in the above embodiment, the gearwheel 1, which is provided with teeth and notches on the outer or inner circumferential surface and rotated, is used as the first member. However, the present invention should not be limited to such an embodiment but may also be so embodied that a moving body which is provided with at least two protrusions or magnetic portions on the plane and linearly shift the position thereof is used as the first member and the amount of the movement thereof is detected.

Figure 7:
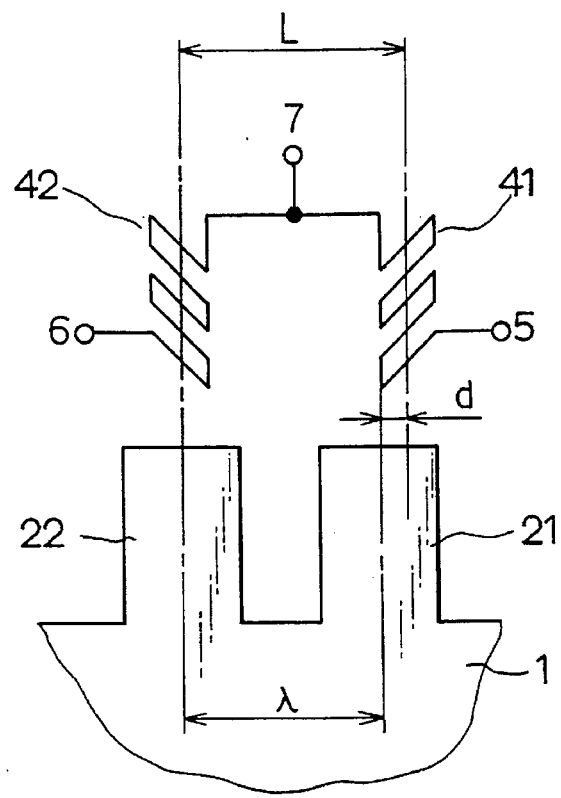
FIG. 7 is a view depicting the amount of the displacement between the gear teeth and the MREs.
Figure 8:
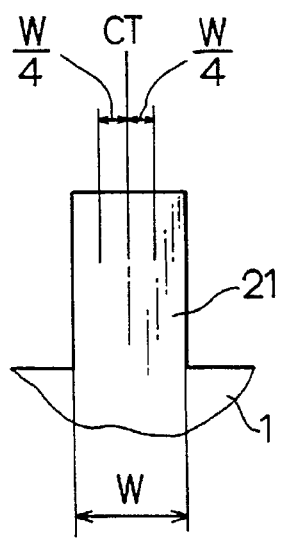
FIG. 8 is a view for explaining the allowable amount of such displacement.

Also, in the above embodiment, the pitch λ of the teeth of the gearwheel 1 is set to be equal to the center-to-center distance L between the MREs 41 and 42. However, the present invention may also be so constructed, as illustrated in FIG. 7, that some displacement is allowed between the pitch λ and the distance L. Specifically, the amount of displacement d between the center-to-center distance L between the MREs 41 and 42 and the tooth pitch λ of the gearwheel 1 or N (an integer) times of the same may be allowed for ±W/4 when W is the tooth width of the gearwheel 1. More specifically, when the center line of the MRE 42 is aligned with the center line of the tooth 22 of the gearwheel 1 in FIG. 7, the displacement d between the center line of the MRE 41 and the center line CT of the tooth 21 should preferably be within ±¼ W (FIG. 8), i.e., the allowable displacement might be W/2. Here, if the displacement d becomes larger than ½ of the tooth width, the center line of the MRE 41 shifts toward an edge part of the tooth 21. Then, as magnetic flux tends to concentrate at the edge part, the respective magnetic fluxes applied to the MREs 41 and 42 differently incline, and as a result, the output is reduced.

Figure 9:
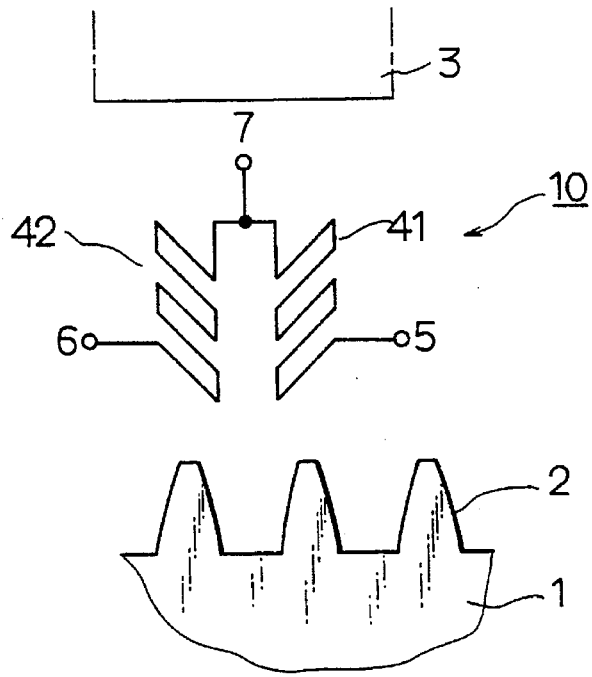
FIGS. 9 and 10 are model views showing another different shape of the gear teeth.
Figure 10:
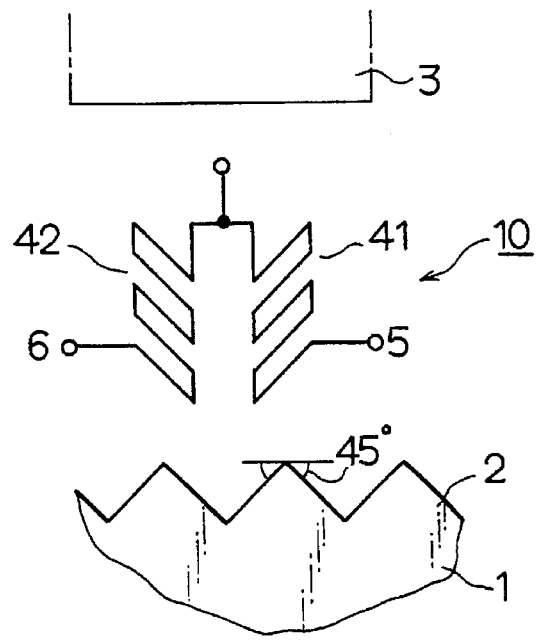

Furthermore, in the above embodiment, the rectangular teeth 21, 22, . . . are used as the protrusive parts formed on the first member. However, the present invention should not be limited to this construction, but may also take any shape, such as gear shape, sawtooth shape, arc shape and triangular shape, as illustrated in FIGS. 9 and 10. In sum, the teeth 2 may take any shape as long as the teeth 2 provide teeth and notches so formed as to have almost the same pitch and shape.

Particularly, by shaping small the tip end parts of the teeth 2 facing the magnet 3 as illustrated in FIGS. 9 and 10, the bridge output can be made in sine wave with little distortion regardless of the gap distance between the teeth 2 and the MREs 41 and 42. This can advantageously prevent the obtained pulse signals from varying according to the gap distance between the teeth 2 and the MREs 41 and 42 when the bridge output is binary-coded.

Moreover, in the above embodiment, the center-to-center distance L between the MREs 41 and 42 is set to be equal to the pitch λ of the teeth 21, 22, . . . of the gearwheel 1. However, the present invention should not be limited to this construction but may also be so constructed that the center-to-center distance L is set to be Nλ (N: positive integer). In this case, the MREs 41 and 42 are imparted with the same phase of the cyclic magnetic field formed within the gap between the gearwheel 1 and the magnet 3, and thus obtaining the same effect.

Still furthermore, in the embodiment, the MRE 41 is inclined by approximately 45° with respect to the direction of the magnetic force lines emitted from the magnet 3, and the MRE 42 is inclined by approximately 135° with respect to the direction of the magnetic force lines emitted from the magnet 3. However, the present invention should not be limited to this construction, but may also be so constructed that the MRE 41 is inclined by approximately 135° with respect to the direction of the magnetic force lines emitted from the magnet 3 and the MRE 42 is inclined by approximately 45° with respect to the direction of the magnetic force lines emitted from the magnet 3.

Still moreover, in the embodiment, a pair of the MREs are used, and each MRE is electrically connected at one end to form a half bridge circuit. However, the present invention should not be limited to this construction, but may also be so constructed that two pairs of MREs are used and each pair of MREs are arranged to form a half bridge circuit and a full bridge circuit is made by electrically connecting the terminals of the respective half bridge circuits to each other.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A displacement detecting device comprising:

a first member provided with a plurality of protrusive parts which have substantially a same pitch and shape;

a second member disposed in opposition to the first member, a facing surface thereof having a width wider than a respective pitch of one of the plurality of protrusive parts of the first member;

one of the first member and second member being made of a magnetism generating material to generate a magnetic field vertically toward the other one of the first member and second member which is made of a magnetic material;

said magnetic field changing cyclically in response to a displacement of the plurality of protrusive parts of the first member with respect to a width direction of the second member;

a first magnetoresistive element and a second magnetoresistive element disposed between the first member and the second member such that the first magnetoresistive element and the second magnetoresistive element are apart from each other in the width direction of the second member and so that, when the first magnetoresistive element approaches one of the plurality of protrusive parts of the first member, the second magnetoresistive element approaches another one of the plurality of protrusive parts of the first member;

the first magnetoresistive element and the second magnetoresistive element being disposed on a plane which is parallel to a plane formed by a magnetic force line direction of the magnetic field and a direction of the displacement of the plurality of protrusive parts of the first member; and detecting means for detecting the displacement of the plurality of protrusive parts of the first member based on a variation of respective resistance values of the first magnetoresistive element and the second magnetoresistive element.

2. A displacement detecting device according to claim 1, wherein:

the first magnetoresistive element and the second magnetoresistive element are disposed in respective positions in which variations of angles of the magnetic field applied according to the respective disposed position of the first magnetoresistive element and the second magnetoresistive element are in a same phase.

3. A displacement detecting device according to claim 2, wherein:

respective angles between long strip portions of the first magnetoresistive element and the second magnetoresistive element and a magnetic force line direction of the magnetic field are such that fluctuating directions of respective variations of the respective resistance values of the first magnetoresistive element and the second magnetoresistive element varying according to variations of the respective angles of the magnetic field are reverse to each other.

4. A displacement detecting device according to claim 3, wherein:

the respective angles between the long strip portions of the first magnetoresistive element and the second magnetoresistive element and the magnetic force line direction of the magnetic field are 45° and 135°, respectively.

5. A displacement detecting device according to claim 1, wherein:

the first magnetoresistive element and the second magnetoresistive element each have patterns in which long strip portions thereof and short strip portions thereof are alternately connected to each other.

6. A displacement detecting device according to claim 1, wherein:

the plurality of protrusive parts are provided on a curved surface of the first member.

7. A displacement detecting device according to claim 1, wherein the detecting means includes:

a bridge circuit comprising the first magnetoresistive element and the second magnetoresistive element.

8. A displacement detecting device according to claim 7, wherein:

the bridge circuit connects in series the first magnetoresistive element and the second magnetoresistive element; and the bridge circuit includes a half bridge circuit making a connection point between the first magnetoresistive element and the second magnetoresistive element as an output terminal.

9. A displacement detecting device according to claim 1, wherein:

a center-to-center distance between the first magnetoresistive element and the second magnetoresistive element substantially coincides with an integral multiple of the pitch of the plurality of protrusive parts within ½ the width of a respective one of the plurality of protrusive parts.

10. A displacement detecting device according to claim 9, wherein:

an error between the center-to-center distance and the integral multiples of the pitch is limited to within ±¼ of the width of a respective one of the plurality of protrusive parts.

11. A displacement detecting device comprising:

a first member provided with a plurality of protrusive parts which have substantially a same pitch and shape;

a second member disposed apart from the first member, a facing surface thereof having a width wider than a respective pitch of one of the plurality of protrusive parts of the first member;

one of the first member and second member being made of a magnetism generating material to generate a magnetic field vertically toward the other one of the first member and second member which is made of a magnetic material;

said magnetic field changing cyclically in response to a displacement of the plurality of protrusive parts of the first member with respect to a width direction of the second member;

a first magnetoresistive element and a second magnetoresistive element disposed between the first member and the second member, resistance values of which vary in response to variation of the magnetic field imparted by the first member and second member;

the first magnetoresistive element and second magnetoresistive element being apart from each other in a width direction of the second member and a center-to-center distance thereof set to substantially coincide with integral multiples of the pitch of the plurality of protrusive parts; and a detector which detects the displacement of the plurality of protrusive parts of the first member based on variation of respective resistance values of the first magnetoresistive element and the second magnetoresistive element.

12. A displacement detecting device according to claim 1, wherein:

the first magnetoresistive element and the second magnetoresistive element are disposed on a plane which is parallel to a plane made by a magnetic force line direction of the magnetic field and a direction of the displacement of the plurality of protrusive parts of the first member.

13. A displacement detecting device according to claim 12, wherein:

the first magnetoresistive element and the second magnetoresistive element are disposed in respective positions in which variations of angles of the magnetic field applied according to the respective disposed position of the first magnetoresistive element and second magnetoresistive element are in a same phase.

14. A displacement detecting device according to claim 13, wherein:

respective angles between long strip portions of the first magnetoresistive element and the second magnetoresistive element and a magnetic force line direction of the magnetic field are such that fluctuating directions of respective variations of the respective resistance values of the first magnetoresistive element and the second magnetoresistive element varying according to variations of the respective angles of the magnetic field are reverse to each other.

15. A displacement deflecting device according to claim 14, wherein:

the respective angles between the long strip portions of the first magnetoresistive element and the second magnetoresistive element and the magnetic force line direction of the magnetic field are 45° and 135°, respectively.

16. A displacement detecting device according to claim 11, wherein:

the first magnetoresistive element and the second magnetoresistive element each have patterns in which long strip portions thereof and short strip portions thereof are alternately connected to each other.

17. A displacement detecting device according to claim 11, wherein:

the plurality of protrusive parts are provided on a curved surface of the first member.

18. A displacement detecting device according to claim 11, wherein the detecting means includes:

a bridge circuit comprising the first magnetoresistive element and the second magnetoresistive element.

19. A displacement detecting device according to claim 18, wherein:

the bridge circuit connects in series the first magnetoresistive element and the second magnetoresistive element; and the bridge circuit includes a half bridge circuit making a connection point between the first magnetoresistive element and the second magnetoresistive element as an output terminal.

20. A displacement detecting device according to claim 11, wherein:

an error between the center-to-center distance and the integral multiples of the pitch is limited to within ±¼ of the width of a respective one of the plurality of protrusive parts.

21. A displacement detecting device according to claim 11, wherein:

the plurality of protrusive parts are provided on a plane surface of the first member.

22. A displacement detecting device according to claim 1, wherein:

the plurality of protrusive parts are provided on a plane surface of the first member.

23. A displacement detecting device according to claim 1, wherein:

the shape of each one of the plurality of protrusive parts is one of a gear shape, sawtooth shape, arc shape and triangular shape.

24. A displacement detecting device according to claim 11, wherein:

the shape of each one of the plurality of protrusive parts is one of a gear shape, sawtooth shape, arc shape and triangular shape.

25. A displacement detecting device comprising:

a first member provided with a plurality of protrusive parts which have substantially a same pitch and shape;

a second member disposed in opposition to the first member, a facing surface thereof having a width wider than a respective pitch of one of the plurality of protrusive parts of the first member;

one of the first member and second member being made of a magnetism generating material to generate a magnetic field vertically toward the other one of the first member and second member which is made of a magnetic material;

said magnetic field changing cyclically in response to a displacement of the plurality of protrusive parts of the first member with respect to a width direction of the second member;

a first magnetoresistive element and a second magnetoresistive element disposed between the first member and the second member such that the first magnetoresistive element and the second magnetoresistive element are apart from each other in the width direction of the second member and so that, when the first magnetoresistive element approaches one of the plurality of protrusive parts of the first member, the second magnetoresistive element approaches another one of the plurality of protrusive parts of the first member;

the first magnetoresistive element and the second magnetoresistive element being disposed on a plane which is parallel to a plane formed by a magnetic force line direction of the magnetic field and a direction of the displacement of the plurality of protrusive parts of the first member; and a detector that detects the displacement of the plurality of protrusive parts of the first member based on a variation of respective resistance values of the first magnetoresistive element and the second magnetoresistive element.

26. A displacement detecting device according to claim 25, wherein:

the first magnetoresistive element and the second magnetoresistive element are disposed in respective positions in which variations of angles of the magnetic field applied according to the respective disposed position of the first magnetoresistive element and second magnetoresistive element are in a same phase.

27. A displacement detecting device according to claim 26, wherein:

respective angles between long strip portions of the first magnetoresistive element and the second magnetoresistive element and a magnetic force line direction of the magnetic field are such that fluctuating directions of respective variations of the respective resistance values of the first magnetoresistive element and the second magnetoresistive element varying according to variations of the respective angles of the magnetic field are reverse to each other.

28. A displacement detecting device according to claim 27, wherein:

the respective angles between the long strip portions of the first magnetoresistive element and the second magnetoresistive element and the magnetic force line direction of the magnetic field are 45° and 135°, respectively.

29. A displacement detecting device according to claim 25, wherein:

the first magnetoresistive element and the second magnetoresistive element each have patterns in which long strip portions thereof and short strip portions thereof are alternately connected to each other.

30. A displacement detecting device according to claim 25, wherein:

the plurality of protrusive parts are provided on a curved surface of the first member.

31. A displacement detecting device according to claim 25, wherein the detector includes:

a bridge circuit comprising the first magnetoresistive element and the second magnetoresistive element.

32. A displacement detecting device according to claim 31, wherein:

the bridge circuit connects in series the first magnetoresistive element and the second magnetoresistive element; and the bridge circuit includes a half bridge circuit making a connection point between the first magnetoresistive element and the second magnetoresistive element as an output terminal.

33. A displacement detecting device according to claim 25, wherein:

an error between the center-to-center distance and the integral multiples of the pitch is limited to within ±¼ of the width of a respective one of the plurality of protrusive parts.

34. A displacement detecting device according to claim 25, wherein:

the plurality of protrusive parts are provided on a plane surface of the first member.

35. A displacement detecting device according to claim 25, wherein:

the shape of each one of the plurality of protrusive parts is one of a gear shape, sawtooth shape, arc shape and triangular shape.

* * * * *